United States Patent [19]
Nekola

[11] Patent Number: 5,241,832
[45] Date of Patent: Sep. 7, 1993

[54] AUTOMOBILE AIR CONDITIONING SYSTEM

[75] Inventor: Frank F. Nekola, Trenton, Fla.

[73] Assignee: Robert R. Pisano, Mt. Prospect, Ill.

[21] Appl. No.: 856,492

[22] Filed: Mar. 23, 1992

[51] Int. Cl.$^5$ .............................................. F25B 41/00
[52] U.S. Cl. ........................................ 62/117; 62/174; 62/196.3
[58] Field of Search ...................... 62/196.3, 174, 498, 62/509, 324.4, 117

[56] References Cited

U.S. PATENT DOCUMENTS 3,855,813 12/1974 St. Laurent .................... 62/196.3
4,488,823 12/1984 Baker ............................... 62/180 X

FOREIGN PATENT DOCUMENTS 0223017 9/1989 Japan ................................ 62/323.3
1262215 10/1986 U.S.S.R. ............................... 62/498

OTHER PUBLICATIONS

King, G. R., *Modern Refrigeration Practice*, p. 234 (other pages unknown) (1971).

Turnquist, Bracciano, and Hause, *Modern Refrigeration and Air Conditioning*, pp. 79, 111, 129 and 213 (1979).

*Classic*, Auto Air Manufacturing Co., Parts Catalog, pages unknown (year unknown).

*Primary Examiner*—William E. Wayner
*Attorney, Agent, or Firm*—Cook, Egan, McFarrow & Manzo, Ltd.

[57] ABSTRACT

A system for compressing gas that changes ambient atmosphere conditions which uses a hermetic compressor, a condenser to receive compressed gas from the compressor and condense it, a liquid receiver to store the condensed gas, an expansion valve to vaporize the condensed gas and an evaporator which interacts with the ambient atmosphere. Isolating devices are used to isolate the compressor from the other parts of the system. A power invertor which changes the direct current to alternating current used with the isolating devices enable the use of a hermetic compressor in a direct current environment. Also included are cooling devices that use the cool internal vapor and the cool water formed on the outside of the evaporator to cool the compressor and its components.

52 Claims, 1 Drawing Sheet

AUTOMOBILE AIR CONDITIONING SYSTEM

FIELD OF THE INVENTION

This invention relates to refrigeration and air-conditioning systems and more particularly to an improved, portable air-conditioning system, which eliminates the need for an exact refrigerant charge and substantially reduces the pressure during the start cycle, thus allowing for the use of a hermetic compressor in a 12 Volt D.C. environment.

DESCRIPTION OF THE PRIOR ART

In the field of refrigeration and air conditioning, many improvements have been made and countless switching devices and apparatus have been developed over the years. Yet, the power consumption of the start cycle of a hermetic compressor is still a problem. It can take up to three times the rated power of the compressor motor to start, due to the internal pressure of the system. This increased power demand usually requires, for example, a household to use a heavier gage wire and larger fuses to supply power to the compressor.

The need for increased power for the start cycle usually exceeds the power output capabilities of an environment which operates from a 12 volt DC power supply. To overcome this problem, these environments rely on other power sources. For example, an automobile uses its engine to power the compressor.

However, powering the compressor in this manner has many disadvantages. There is increased load and wear on the engine and decreased engine efficiency. The compressor must be placed in close proximity to the engine because of the way in which power is mechanically transferred from the engine to the compressor. The compressor power is also dependent on the engine speed. Further, such mechanical compressors require a longer time after starting to provide cool air.

The capillary tube has been used to overcome the problem of increased power consumption in the start cycle. When the compressor is off, refrigerant is allowed to flow back into the capillary tube to equalize the high and low pressure sides. This permits easier starting. Although the pressure is equalized between the high and low pressure sides, however, the system is still pressurized and therefore the motor starts under pressure. Moreover, the inner diameter of the capillary tube is so small that small pieces of foreign matter, such as dirt, can cause problems.

Another problem is that the pressure determines how long the start cycle lasts. More pressure usually means that the start cycle lasts longer. This causes an increased current to flow through the compressor motor windings for a longer duration. This generates greater heat in the motor and therefore shortens its life span.

A further problem of the prior art is that the amount of refrigerant charge must be exact if capillary tubes are used. Also, the compressor has seals that may leak the refrigerant into the atmosphere.

Still another problem is that the temperature of the compressor and its motor may be an unsafe 75° F. higher than the ambient temperature. The safety range for these components is typically 150° F.

An object of the present invention is to substantially reduce the pressure during the start cycle. This will reduce the output power requirements from the power supply to the compressor and increase the compressor's efficiency. It will also eliminate the need for heavy gauge wire and larger fuses. It will also allow a hermetic compressor to be used in an air conditioning system that is powered by a 12 volt DC power supply.

Another object of the invention is to provide an apparatus to cool the compressor and its motor in order to increase its efficiency and life span, and to maintain the compressor and its motor in a safe operating temperature range.

A further object of the invention is to provide an air conditioning system that does not require an exact refrigerant charge.

Still another object of the invention is to provide a portable air-conditioning unit which can be placed independently of the power source and is not dependent on the speed of the power source.

A still further object of the invention is to provide for the use of a hermetic compressor in a 12 volt DC environment which provides quicker cooling than a mechanically powered compressor. It will also not leak the refrigerant into the atmosphere.

SUMMARY OF THE INVENTION

The present invention comprises a system for changing ambient fluid conditions which includes a compressor connected to a high pressure reservoir. Such a system is exemplified by a portable air-conditioning system which includes a liquid receiver, a condenser, an evaporator and an automotive-type evaporation valve which in combination condense and vaporize the refrigerant. A control arrangement is also included to reduce the internal pressure of the system during the start cycle. The use of the above components with a power invertor allow for the use of a hermetic compressor in a 12 volt DC environment.

The automotive-type expansion valve and the liquid receiver, which stores the refrigerant, compensate for pressure and temperature differences. These parts eliminate the need for a capillary tube which in turn eliminates the need for an exact charge.

Additionally, the system utilizes cooling apparatus to maintain the compressor and its motor in a safe temperature operating range. The cooling of the compressor and its motor also increases their efficiency and life span.

DESCRIPTION OF PREFERRED EMBODIMENT

Figure 1:
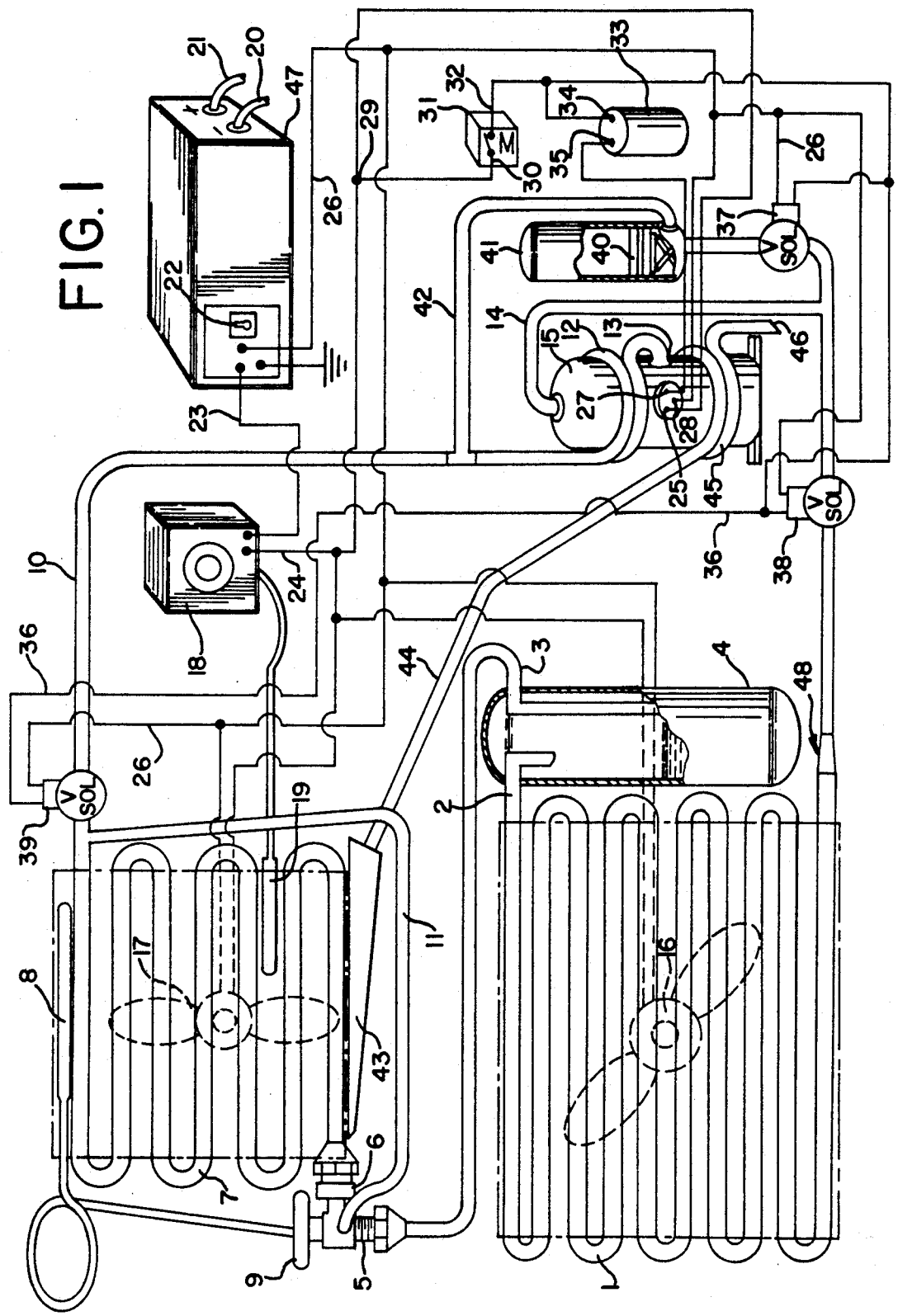
FIG. 1 is a preferred embodiment of the invention configured for an environment powered by a DC power supply.

The preferred embodiment of the present invention is particularly suitable for an automobile. Since the preferred embodiment uses an electric compressor, no power is needed from the engine. Its placement is independent of the engine.

Referring to FIG. 1, for exemplary purposes the cycle of operation begins with condenser 1. Vapor refrigerant changed to liquid by condenser 1, a fluid phase changer apparatus enters a liquid receiver 4 through a discharge line 2. The liquid then passes through liquid receiver 4 by way of line 3 into an expansion valve 5. Expansion valve 5 is preferably controlled by a sensing bulb 8 which activates a diaphragm 9 in the expansion valve 5. Diaphragm 9 opens and closes expansion valve 5 preferably according to a suction line 10 temperature.

The high pressure of the liquid entering expansion valve 5 is reduced to vaporize the liquid. The vapor then enters the suction side of an evaporator 7 via an inlet 6. The vapor cools evaporator 7, thus absorbing heat from the surrounding area. In FIG. 1, pressure is fed back to expansion valve 5 via an equalizing tube 11. The pressure of evaporator 7 is kept constant, thereby keeping the pressure from going too low and freezing. The preceding components can be considered to form a high pressure reservoir.

Vapor leaves evaporator 7 by the suction line 10, and enters a cooling coil 12, a first cooling apparatus where it cools the compressor motor, not shown. The vapor then enters the suction side of a compressor 15 a hermetic compressor or pump, through an inlet 13. There, the vapor is compressed and its temperature increases. Heated vapor leaves compressor 15 through a line 14. It enters condenser 1 at 48 where it is condensed.

Condenser 1 is preferably air cooled by an electric fan 16. The cooling may also be aided by aluminum fins, not shown, attached to condenser 1. The ambient air cooled by evaporator 7 is preferably controlled by an electric fan 17. Both fans 16 and 17 are actuated by a temperature control and on-off switch 18. In the preferred embodiment, temperature control and on-off switch 18 is activated by a temperature control bulb 19 which is responsive to the temperature of evaporator 7.

As seen in FIG. 1, power is supplied to temperature control and on-off switch 18 from an invertor 47. Invertor 47 preferably generates a sine wave which is capable of delivering bursts of power when placed under momentary power loads. This will lessen the chance of any burnout due to insufficient power. Surge protectors, not shown, may be incorporated into this apparatus.

As shown in FIG. 1, a direct current is supplied to invertor 47 at terminals 20 and 21. Here, the direct current supplied is changed to alternating current. When power is turned on at a switch 22, current flows through a main power line 23 to thermostat control and on-off switch 18. A line 24, once activated, becomes the main power feed line. Power is sent by line 24 directly to a run terminal 25 of a compressor motor, not shown. A line 26 from invertor 47 is preferably a common lead and goes directly to a terminal 28 of the compressor motor, not shown.

In the present instance, a line 29 enters a start relay 31 at a terminal 30 and exits at a terminal 32, where it branches. One branch of line 29 continues to a terminal 34 of a capacitor 33, exits from a terminal 35 of capacitor 33 to a start terminal 27 of the compressor motor, not shown. Start terminal 27 preferably provides the power for the start cycle. The other branch of line 29 provides power to a line 36 which powers solenoids 37, 38, and 39 in the preferred construction. Solenoids 37, 38 and 39 are also preferably coupled to line 26. These solenoids are used to open and close the suction and high pressure sides of compressor 15 to the other parts of the system and to each other.

The start cycle will now be explained in detail with reference to FIG. 1. As power is fed to start terminal 27, line 36 powers isolating devices shown as solenoids 37, 38, and 39. These solenoids preferably use only a, in a control arrangement, small amount of power during the start cycle. Solenoids 38 and 39 close, causing compressor 15 to be isolated from condenser 1 and evaporator 7. Since line 42 remains open at all times, the suction side of compressor 15 pulls and maintains a preferred spring loaded plunger 40 in the down position as shown in FIG. 1.

When solenoid 37 is opened during the start cycle, a spring, or resilient member, of spring loaded plunger 40 pushes the plunger upward into a cylinder, container or volume increasing apparatus 41. This sucks out the remaining vapor and substantially reduces the pressure of compressor 15. The start cycle is complete when the motor starts. Solenoids 38 and 39 then open and solenoid 37 closes, leaving line 42 open to the suction side of compressor 15. The suction side of compressor 15 pulls spring loaded plunger 40 down and removes the vapor, returning it to compressor 15 via compressor inlet 13.

As also seen in FIG. 1, oil, not shown, contained in the lower part of compressor 15 is cooled by water from the exterior of evaporator 7. Cold water is collected in catch basin 43 proximately located to evaporator 7. The cold water is passed through line 44 to cooling coil 45, a second cooling apparatus and exits from outlet 46, cooling compressor 15 and its oil.

It should be recognized that this invention is not restricted to use in 12 volt DC environments. If the invertor is removed, this system can be powered by, for example, regular household current.

The refrigerant used preferably condenses at approximately 86° F. and 95 psi. Nevertheless, the present invention is also compatible with tetrafluoroethane refrigerants such as Technical Chemical's KLEA 134A, DuPont's SUVA 134A or those refrigerants that have a low to medium vapor pressure. To make use of these refrigerants, expansion valve 5 may have to be adjusted or replaced with another valve having a different pressure rating, depending on the refrigerant.

Although the preferred embodiment was explained using a refrigerant, one skilled in the art would recognize that the present invention is not limited to such use, but may be used with other types of fluids. In addition, the compressor recited may be substituted with a pump or the like.

While this specification refers to specific devices, these references are not intended as limitations. Rather, the specification is intended to cover any substitutions, modifications, variations and additions that would be apparent to one of ordinary skill in the art.

I claim:

1. An apparatus for compressing a fluid comprising:
   a pump;
   a high pressure reservoir including a fluid phase changer apparatus and a heat absorption apparatus in pressure communication with said pump;
   a control arrangement for responsively isolating said pump from said high pressure reservoir; and
   a start facilitating apparatus for responsively reducing a pressure between high pressure and suction sides of said pump.

2. An apparatus for compressing a fluid according to claim 1 wherein said pump is a compressor.

3. An apparatus for compressing a fluid according to claim 2 wherein said compressor is a hermetic compressor.

4. An apparatus for compressing fluid according to claim 2 further comprising a power invertor electrically coupled to the compressor wherein said invertor converts direct current to alternating current.

5. An apparatus for compressing a fluid according to claim 1 wherein said fluid is compressible.

6. An apparatus for compressing a fluid according to claim 1 wherein said fluid is a refrigerant.

7. An apparatus for compressing a fluid according to claim 5 wherein said refrigerant is a tetraflouroethane.

8. An apparatus for compressing a fluid according to claim 1 wherein said control arrangement and said start facilitating arrangement include isolating devices.

9. An apparatus for compressing a fluid according to claim 7 wherein said isolating devices include solenoids.

10. An apparatus for compressing a fluid according to claim 1 wherein said start facilitating arrangement includes a container and a conduit for reducing the pressure.

11. An apparatus for compressing a fluid according to claim 10 wherein said container comprises a resilient member coupled to a plunger.

12. An apparatus for compressing a fluid according to claim 1 wherein:
the fluid phase changer apparatus is a condenser; and
the heat absorption apparatus is an evaporator coupled to said condenser.

13. An apparatus for compressing a fluid according to claim 11 further comprising a temperature control and on-off switch which is responsive to a temperature of said evaporator and electrically coupled to a power invertor, said pump, said control arrangement, said start facilitating arrangement and a plurality of ambient fluid circulators.

14. An apparatus for compressing a fluid according to claim 11 wherein said high pressure reservoir further comprises a liquid receiver coupled to said condenser; and an expansion valve coupled between said liquid receiver and said evaporator.

15. An apparatus for compressing a fluid according to claim 1 further comprising:
a first cooling apparatus in fluid communication with said evaporator and in thermal communication with said pump; and
a second cooling apparatus in pressure communication with said evaporator and in thermal communication with said pump.

16. An apparatus for compressing a fluid comprising:
a pump;
a condenser coupled to said pump;
a liquid receiver coupled to said condenser;
an expansion valve coupled to said liquid receiver;
an evaporator coupled between said expansion valve and said pump;
a control arrangement for responsively isolating said pump from said condenser, said liquid receiver, said expansion valve and said evaporator; and
a start facilitating apparatus for responsively reducing a pressure between high pressure and suction sides of said pump, said start facilitating apparatus including a conduit and a volume increasing apparatus.

17. An apparatus for compressing a fluid according to claim 16 wherein said pump is a compressor.

18. An apparatus for compressing a fluid according to claim 17 wherein said compressor is a hermetic compressor.

19. An apparatus for compressing a fluid according to claim 17 further comprising a power invertor electrically coupled to the compressor wherein said invertor converts direct current to alternating current.

20. An apparatus for compressing a fluid according to claim 19 further comprising a temperature control and on-off switch which is responsive to a temperature of said evaporator and electrically coupled to said power invertor, said pump, a control arrangement, a start facilitating arrangement and a plurality of ambient fluid circulators.

21. An apparatus for compressing a fluid according to claim 16 wherein said fluid is compressible.

22. An apparatus for compressing a fluid according to claim 16 wherein said fluid is a refrigerant.

23. An apparatus for compressing a fluid according to claim 22 wherein said refrigerant is a tetraflouroethane.

24. An apparatus for compressing a fluid according to claim 16 wherein said control arrangement and start facilitating arrangement include isolating devices.

25. An apparatus for compressing a fluid according to claim 24 wherein said isolating devices include solenoids.

26. An apparatus for compressing a fluid according to claim 16 wherein said start facilitating arrangement further comprises a container for reducing the pressure of said high pressure side.

27. An apparatus for compressing a fluid according to claim 25 wherein said container includes a resilient member engaged to a plunger.

28. An apparatus for compressing a fluid according to claim 16 further comprising:
a first cooling apparatus in pressure communication with said evaporator and in thermal communication with said pump; and
a second cooling apparatus in fluid communication with said evaporator and in thermal communication with said pump.

29. An apparatus for compressing a fluid comprising:
a pump;
a condenser coupled to said pump;
a liquid receiver coupled to said condenser;
an expansion valve coupled to said liquid receiver;
an evaporator coupled between said expansion valve and said pump;
a volume increasing apparatus for a pressure reduction; and
a plurality of isolating devices including first, second and third isolating devices, the first and second isolating devices isolating said pump from said evaporator, expansion valve, liquid receiver and condenser, and the third isolating device and said volume increasing apparatus being interposed between the high pressure and suction sides of said pump.

30. An apparatus for compressing a fluid according to claim 29 wherein said pump is a compressor.

31. An apparatus for compressing a fluid according to claim 30 wherein said compressor is is a hermetic compressor.

32. An apparatus for compressing a fluid according to claim 31 wherein said fluid is compressible.

33. An apparatus for compressing a fluid according to claim 30 further comprising a power invertor electrically coupled to the compressor wherein said invertor converts direct current to alternating current.

34. An apparatus for compressing a fluid according to claim 33 further comprising a temperature control and on-off switch which is responsive to a temperature of said evaporator and electrically coupled to said power invertor, said pump, said control arrangement, and at least one ambient fluid circulator.

35. An apparatus for compressing a fluid according to claim 30 wherein said fluid is a refrigerant.

36. An apparatus for compressing a fluid according to claim 34 wherein said refrigerant is a tetraflouroethane.

37. An apparatus for compressing a fluid according to claim 30 wherein said isolating devices include solenoids.

38. An apparatus for compressing a fluid according to claim 29 wherein the volume increasing apparatus includes a container for reducing the pressure of the high pressure side of said pump.

39. An apparatus for compressing a fluid according to claim 38 wherein said container includes a resilient member engaged to a plunger.

40. An apparatus for compressing a fluid according to claim 29 further comprising:
first and second cooling apparatuses in fluid communication with said evaporator and in thermal communication with said pump.

41. An apparatus for compressing a fluid comprising:
a pump;
a condenser coupled to said pump;
a liquid receiver coupled to said condenser;
an expansion valve coupled to said liquid receiver;
an evaporator coupled between said expansion valve and said pump;
a control arrangement for responsively isolating a pressure between said pump and said condenser, liquid receiver, expansion valve and evaporator;
a start facilitating apparatus for responsively reducing the pressure between high pressure and suction sides of said pump, said start facilitating apparatus including a volume increasing apparatus and a conduit;
a power invertor electrically coupled to said pump wherein said invertor converts direct current to alternating current;
and
a temperature control and on-off switch which is responsive to a temperature of said evaporator and electrically coupled to said power invertor, said pump, said control arrangement and said start facilitating arrangement.

42. An apparatus for compressing a fluid according to claim 41 wherein said pump is a compressor.

43. An apparatus for compressing a fluid according to claim 42 wherein said compressor is a hermetic compressor.

44. An apparatus for compressing a fluid according to claim 41 wherein said fluid is compressible.

45. An apparatus for compressing a fluid according to claim 41 wherein said fluid is a refrigerant.

46. An apparatus for compressing a fluid according to claim 45 wherein said refrigerant is a tetraflouroethane.

47. An apparatus for compressing a fluid according to claim 41 wherein said control arrangement and said start facilitating arrangement include isolating devices.

48. An apparatus for compressing a fluid according to claim 46 wherein said isolating devices include solenoids.

49. An apparatus for compressing a fluid according to claim 41 wherein the volume increasing apparatus includes a container for reducing the pressure of a high pressure side of said pump.

50. An apparatus for compressing fluid according to claim 49 wherein said container comprises a resilient member coupled to a plunger, which is responsive to said start facilitating arrangement.

51. A method for compressing a fluid comprising the steps of:
isolating a suction side of a pump from a high pressure reservoir, the high pressure reservoir includes a fluid phase changer apparatus and a heat absorption apparatus;
isolating a high pressure side of said pump from said high pressure reservoir;
connecting the suction side to the high pressure side to equalize pressures at the suction and high pressure sides; and
increasing the volume of said connection between said suction side and said high pressure side to further reduce the equalized pressures.

52. A method for compressing a fluid as in claim 51 further comprising the steps of:
disconnecting said suction side from said high pressure side;
connecting said suction side to said high pressure reservoir; and
connecting said high pressure side to said high pressure reservoir.

* * * * *